United States Patent [19]

Ohuchi

[11] Patent Number: 4,907,284
[45] Date of Patent: Mar. 6, 1990

[54] IMAGE PROCESSING APPARATUS HAVING FUNCTION OF ENLARGEMENT AND/OR SHRINKAGE OF IMAGE

[75] Inventor: Mitsurou Ohuchi, Tokyo, Japan

[73] Assignee: NEC Corporation, Tokyo, Japan

[21] Appl. No.: 47,344

[22] Filed: May 8, 1987

[30] Foreign Application Priority Data

May 8, 1986 [JP] Japan .................................. 61-105917

[51] Int. Cl.$^4$ .............................................. G06K 9/42
[52] U.S. Cl. ...................................... 382/47; 340/731
[58] Field of Search .......................... 382/47; 340/731; 358/22, 287

[56] References Cited

U.S. PATENT DOCUMENTS

| | | |
|---|---|---|
| 4,097,846 | 6/1978 | Lewis .................................... 382/47 |
| 4,107,786 | 8/1978 | Masaki et al. ....................... 340/731 |
| 4,598,283 | 7/1986 | Tung et al. ............................ 382/47 |
| 4,633,503 | 12/1986 | Hinman ................................ 382/47 |
| 4,675,908 | 6/1987 | Saito et al. ............................ 382/47 |
| 4,729,107 | 3/1988 | Hasegawa ............................ 382/47 |

OTHER PUBLICATIONS

Ledley, Digital Computer and Control Engineering, McGraw-Hill Book Company—1960, pp. 562-565.

*Primary Examiner*—Leo H. Boudreau
*Attorney, Agent, or Firm*—Sughrue, Mion, Zinn, Macpeak & Seas

[57] ABSTRACT

An image processing apparatus capable of shrinking or enlarging images. A plurality of bits representing the image to be processed are applied in word format to a plurality of gate circuits which selectively pass certain ones of the bits in each received word in accordance with a selected shrinking or enlargement scale factor. For shrinking the gate circuits pass selected ones of the bits forming each word, but less than the number of bits in a received word. For enlargement the gate circuits pass the full number of bits in each word, but cause the bits constituting a word at the output of the gate circuits to contain two or more bits of the same content as that of at least the first bit of each input word. Packing apparatus is provided to pack bits at the output of the gate circuits representing a shrunk image into words having a number of bits equal to that of input words to the gate circuits.

6 Claims, 5 Drawing Sheets

FIG.3a

| SHRINKING SCALE FACTOR | SHRINKING CKT OUTPUT |
|---|---|
| 1 / 8 | A — — — — — — — |
| 2 / 8 | A E — — — — — — |
| 3 / 8 | A D G — — — — — |
| 4 / 8 | A C E G — — — — |
| 5 / 8 | A C D F H — — — |
| 6 / 8 | A B D E F H — — |
| 7 / 8 | A B C D F G H — |

FIG.3b

| ENLARGEMENT SCALE FACTOR | ENLARGEMENT CKT OUTPUT |
|---|---|
| 8 / 7 | A A B C D E F G |
| 8 / 6 | A A B C D D E F |
| 8 / 5 | A A B B C D D E |
| 8 / 4 | A A B B C C D D |
| 8 / 3 | A A A B B B C C |
| 8 / 2 | A A A A B B B B |
| 8 / 1 | A A A A A A A A |

FIG.3c

| A | B | C | D | E | F | G | H |

FIG. 4

| SCALE FACTOR | NUMBER OF BITS TO BE SHIFTED (ROTATED) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| 1/8 | 0 | 1 | 2 | 3 | 4 | 5 | 6 | 7 | | | | | | | | |
| 2/8 | 0 | 2 | 4 | 6 | 0 | 2 | 4 | 6 | | | | | | | | |
| 3/8 | 0 | 3 | 6 | 1 | 4 | 7 | 2 | 5 | | | | | | | | |
| 4/8 | 0 | 4 | 0 | 4 | 0 | 4 | 0 | 4 | | | | | | | | |
| 5/8 | 0 | 5 | 2 | 7 | 4 | 1 | 6 | 3 | | | | | | | | |
| 6/8 | 0 | 6 | 4 | 2 | 0 | 6 | 4 | 2 | | | | | | | | |
| 7/8 | 0 | 7 | 6 | 5 | 4 | 3 | 2 | 1 | | | | | | | | |
| 8/8 | 0 | 0 | 0 | 0 | 0 | 0 | 0 | 0 | | | | | | | | |
| 8/8 | 0 | 0 | 0 | 0 | 0 | 0 | 0 | 0 | 0 | 0 | 0 | 0 | 0 | 0 | 0 | 0 |
| 8/7 | 0 | 7 | 14 | 5 | 12 | 3 | 10 | 1 | 8 | 15 | 6 | 13 | 4 | 11 | 2 | 9 |
| 8/6 | 0 | 6 | 12 | 2 | 8 | 14 | 4 | 10 | 0 | 6 | 12 | 2 | 8 | 14 | 4 | 10 |
| 8/5 | 0 | 5 | 10 | 15 | 4 | 9 | 14 | 3 | 8 | 13 | 2 | 7 | 12 | 1 | 6 | 11 |
| 8/4 | 0 | 4 | 8 | 12 | 0 | 4 | 8 | 12 | 0 | 4 | 8 | 12 | 0 | 4 | 8 | 12 |
| 8/3 | 0 | 3 | 6 | 9 | 12 | 15 | 2 | 5 | 8 | 11 | 14 | 1 | 4 | 7 | 10 | 13 |
| 8/2 | 0 | 2 | 4 | 6 | 8 | 10 | 12 | 14 | 0 | 2 | 4 | 6 | 8 | 10 | 12 | 14 |
| 8/1 | 0 | 1 | 2 | 3 | 4 | 5 | 6 | 7 | 8 | 9 | 10 | 11 | 12 | 13 | 14 | 15 |

SHRINKING a: rows 1/8 through 8/8 (first)

ENLARGEMENT b: rows 8/8 (second) through 8/1

1

IMAGE PROCESSING APPARATUS HAVING FUNCTION OF ENLARGEMENT AND/OR SHRINKAGE OF IMAGE

BACKGROUND OF THE INVENTION

This invention relates to an image processing apparatus having a function of enlarging and/or shrinking a source image with an arbitrary scale factor.

According to a conventional image processing technique, enlarging (or zooming) an image by z times or shrinking it by 1/z times was easily performed, if z is an integer. However, enlargement by n/m times (n and m are integers and n>m>o) or shrinkage by m/n times was difficult and required a long processing period with extremely complex software operations.

Heretofore, NN (Nearest Neighbor) method has been proposed to execute enlargement by n/m times and shrinkage by m/n times. However, it requires a large amount of complex calculations for each bit to be enlarged or shrinked. Therefore, even if the high-level software technique is employed, a long period of time must be spent.

Furthermore, image data is processed word by word in general. However, since the image data must be processed bit by bit in accordance with the NN method, processed bits must be packed word by word. This packing opeation also requires a long period of time.

SUMMARY OF THE INVENTION

An object of the present invention is to provide an image processing apparatus which can perform enlarging operation and/or shrinkage operation at a high speed without executive complex calculation.

An image processing apparatus of the present invention comprises means for receiving a plurality of original image data word by word, each data consisting of a fixed number of bits, an enlarging or shrinking circuit having a plurality of gating circuits each getting arbitrary bit or bits of the original image data according to a scale factor, a means for selecting one of the gating circuits in response to a signal representing a desired scale factor to open the selected gate, and means for outputting an image data which consists of bit or bits passing through the selected gating circuit. A mask circuit and a rotator may be used to perform a packing operation to pack the outputted image data into one word, if necessary.

For enlargement, each gating circuit gates those bits which are the same in number as those of the original image data and which contain two or more bits having the same content as one of the bits of the original image data. For shrinkage, the gating circuits gate different numbers of bits less than the number of bits of the original image data.

BRIEF DESCRIPTION OF THE DRAWINGS

FIG. 3(a) shows an output format of a shrinking circuit of the embodiment;

FIG. 3(b) shows an output format of an enlargement circuit of the embodiment;

FIG. 3(c) shows a data format to be entered into an input register of the embodiment;

FIG. 4 shows a table of a number of bits to be rotated (or shifted);

DESCRIPTION OF THE PREFERRED EMBODIMENT

Figure 1:
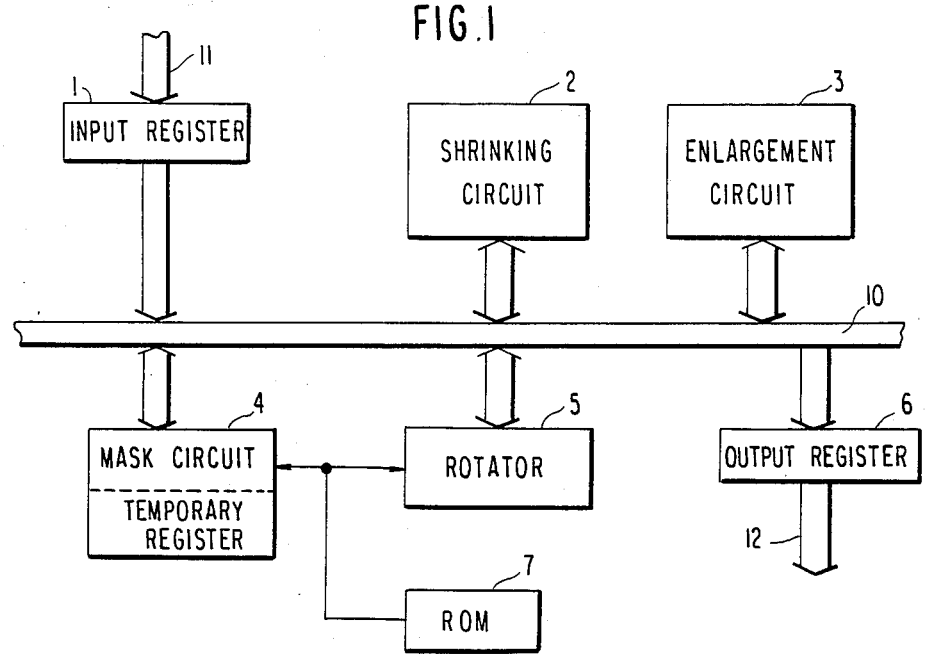
FIG. 1 shows a block diagram of an image processing apparatus according to an embodiment of the present invention.

According to the present invention, pixel data of a source image to be enlarged or shrinked are processed word by word without using complex calculation. Referring to FIG. 1, an image processing apparatus according to one embodiment of the present invention has an input register 1, a shrinkage circuit 2, an enlarging circuit 3, a mask circuit 4 having a temporary register, a rotator 5, an output register 6, and a read only memory (ROM 7), all of which are coupled to a common bus 10. The shrinking circuit 2 works to shrink a source image and may be omitted if shrinking operation is not required. The enlarging circuit 3 may be omitted if enlargement is not required. The mask circuit 4, the rotator 5 and the ROM 7 are used to simplify the packing opeation.

In this embodiment, it is assumed that one word consists of 8 bits (8 pixel data). The pixel data of the source image are entered into the input register 11 via a bus 11 word and a processed pixel data are derived from the output register 6 to a bus 12 word by word.

Figure 2A:
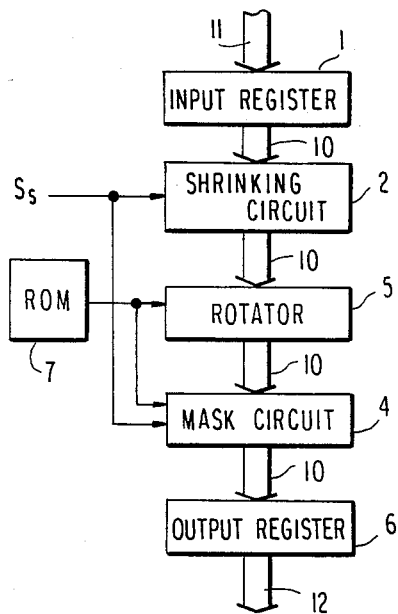
FIG. 2(a) shows a diagram illustrating a data flow when a shrinking operation is performed in the embodiment.
Figure 2B:
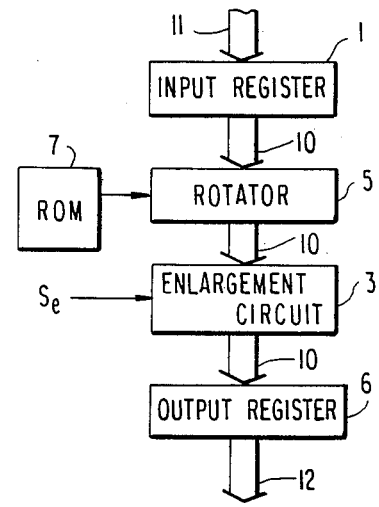
FIG. 2(b) shows a diagram illustrating a data flow when an enlargement operation is performed in the embodiment.

The source image usually consists of a plurality of words and is stored in a source memory (not shown). The source image is read out therefrom word by word. Each word consists of 8 bits of continuous pixel data in horizontal direction of XY co-ordinates and is entered into the input register 1 which has a capacity of 16 bits. When the shrinking operation is to be performed a word to be shrinked is entered into the shrinking circuit 2 and thereafter a shrinked pixel data is sent to the rotator 5 and the mask circuit 4 as shown in FIG. 2(a). While, in the enlargement operation, two consecutive words are entered into the input register 1 and sent therefrom to the rotator 5 and thereafter the rotated word is sent to the enlargement circuit 3 as shown in FIG. 2(b).

Shrinking Operation

In the shrinking operation, arbitrary bit or bits are picked up among 8 bits of pixel data according to a shrinking scale factor Ss (Ss=m/n). The shrinkage circuit 2 is formed of simple selecting circuits which are predetermined to pick up the bit or bits in accordance with the shrinkage factors. If the shrinking scale factor Ss is selected among seven factors ⅛, 2/8, ⅜, 4/8, ⅝, 6/8 and ⅞ and 8 bits pixel data are represented by A B C E D F G H as shown in FIG. 3(c), the bit or bits to be picked up are predetermined as shown in FIG. 3(a).

Figure 5:
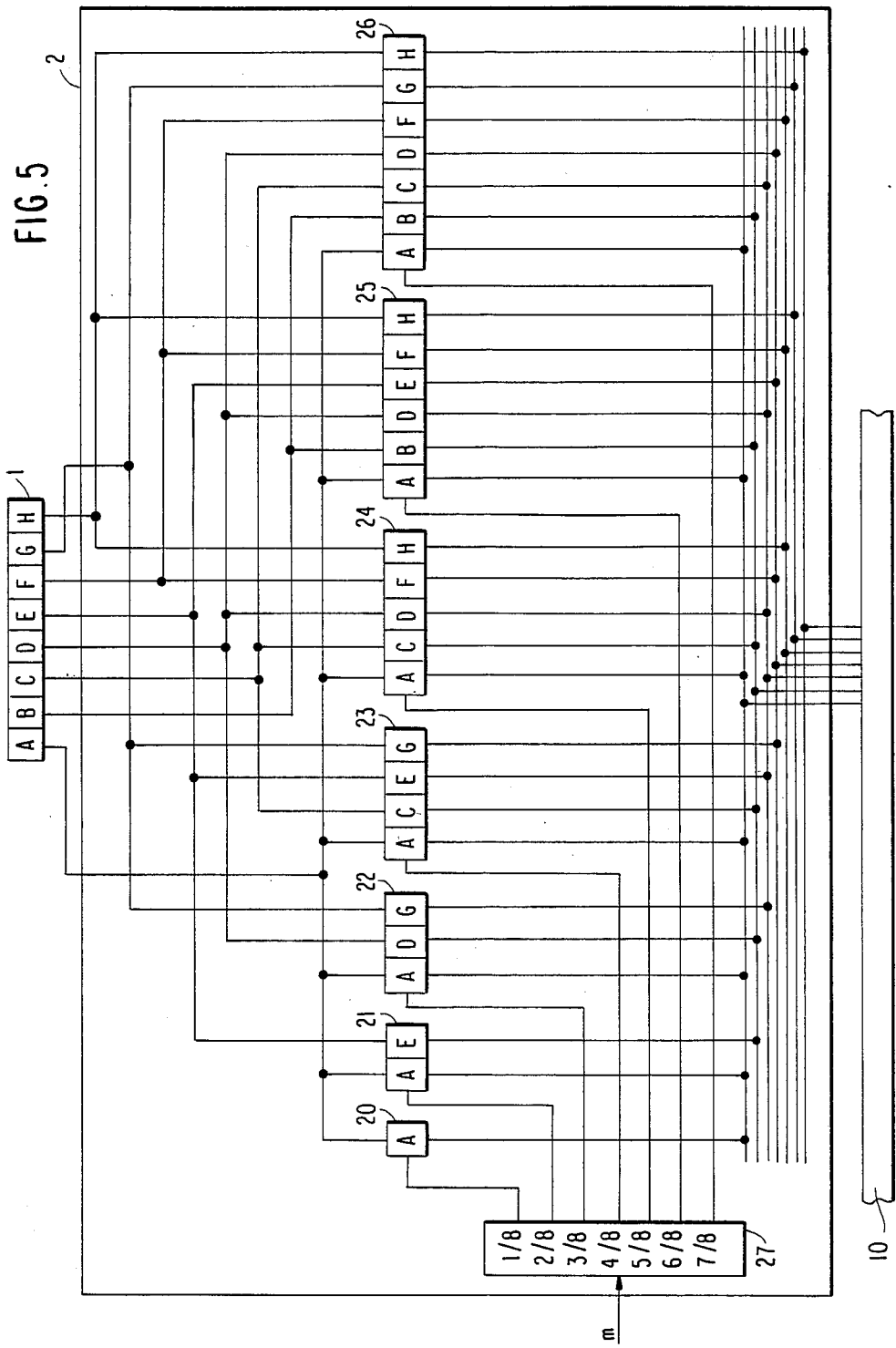
FIG. 5 shows a block diagram of the shrinking circuit of the embodiment.

The pixel data (word) of FIG. 3(c) is sent to the shrinkage circuit 2 via the common bus 10, and the shrinkage circuit 2 has a selecting function to select one of the seven outputs shown in FIG. 3(a) according to the shrinkage scale factor Ss. Referring to FIG. 5, the shrinking circuit 2 has seven gate circuits 20 to 26 and a decoder 27 to select one of the seven gate circuits according to the shrinkage scale factor Ss. Since the shrinkage scale m/n is m/8, m (=1, 2, ..., 7) as the numerator is used instead of Ss. Each bit of the input register 1 is connected to the gate circuits 20 to 26 as shown in FIG. 5. When m is 1, the decoder 27 outputs a signal for the shrinkage scale factor of ⅛ to activate or enable the gate circuit 20 only. Thus, the pixel data A is picked up. When m is 2, the gate circuit 21 is selectively enabled and the pixel data A and E are picked up. When m is 3, 4, 5, 6, or 7, the gate circuit 22, 23, 24, 25 or 26 is selected, respectively, and the pixel data ADG, ACEG, ACDEFH, ABDEFH and ABCDFGH are picked up. As shown in FIG. 5, the shrinking circuit 2 can be formed as a simple selector.

Since a number of bits of a shrinked pixel data is less than that or one word input data (8 bits of pixcel data), packing operation is required to pack outputs of the shrinking circuit 2 into one word.

The packing operation is executed by use of the rotator 5 and the masking circuit 4. The well-known shift register having a feedback loop to return a shift out bit or bits to its input can be used as the rotator 5. A barrel shifter is suitable as the shift register. A number of bits to be shifted is determined according to the shrinking scale factor as shown in FIG. 4. When the source image is shrinked by m/8 times, m bits are picked up from 8 bits of a first one word as shown in FIG. 3(a). The picked-up m bits are entered into the mask circuit 4 through the rotator 5. At this time the picked-up m bits are not shifted and are entered into 1st to mth bit positions of the mask circuit 4. In this embodiment the mask circuit 4 and the temporary register have 16-bit positions, respectively, for the enlargement operation and 8-bit positions can only used in the shrinking operation. An output of the mask circuit 4 is set at 1st to 8th bit positions of the temporary register.

For example, when the source image is shrinked by ⅜ times, 3 bits among 8 bits of a first word are picked up by the shrinking circuit 2. These 3 bits are not shifted and are entered into 1st to 3rd bit positions of the mask circuit 4. The mask circuit 4 masks the remainder 4th to 8th bit positions. Consequently, the 3 bits picked up from the first word are set into 1st to 3rd bit positions of the temporary register. Thereafter a second word subsequent to the first word is entered into the shrinking circuit 2 and 3 bits thereof are picked up. These subsequently shrinked 3 bits are shifted by 3 bit positions in the rotator 5 and entered into 4th to 6th bit positions of the mask circuit 4. At this time, the mask circuit 4 masks the bit positions (1st to 3rd and 7th to 8th) except for the 4th to 6th bit positions. Thus, the 3 bits picked up from the second word are set into the 4th to 6th bit positions of the temporary register. Then, a third word subsequent to the second word is entered into the shrinking circuit 2 and the picked up 3 bits are sent to the rotator 5 where they are shifted by 6 bit positions as indicated in FIG. 4. First two of the shifted three bits are entered into the 7th and 8th vacant bit positions of the temporary register via the mask circuit 4 which masks the 1st to 6th bit positions. As a result, 8 bit positions are filled up to form one word which corresponds to ⅜—shrinked word and which is sent to the output register 6 and then to a destination memory (not shown) which is coupled to the bus 12. The last bit of the three bits out of the input third word is shifted out from the rotator 5 and is rotated to a first bit position of the rotator 4. The rotated last bit is thereafter entered into the 1st bit position of the mask circuit 4 and is set in the 1st bit position of the temporary register. Successively, a fourth word is applied to the shrinking circuit 2 through the input register 1 and 3 bits are picked up by the shrinking circuit 2. The picked up 3 bits from the fourth word are shifted by one bit in the rotator 5 as shown in FIG. 4 and are written into the 2nd to 4th bit positions of the temporary register through the mask circuit. In such manner, shrinking operation proceeds and the shrinked pixel data of 8 bits is packed word by word. With respect to the other shrinking scale factors (m=1, 4, 5, 6, 7 or 8), m bits are picked up from each word by the shrinking circuit 2, shifted or rotated by the rotator 5 by the respective bits shown in FIG. 4, and written into the temporary register from which the shrinked data is read 8 bits by 8 bits. Data shown in FIG. 4 representing the number of bits to be shifted or rotated are stored in the ROM 7 and are read out thereof according to the scale factor m.

Enlargement Operation

When the source image is to be enlarged by 8/m times (m=1, 2, ...,7 or 8), a word entered into the input register 1 is sent to the rotator 5. In the enlargement operation 16 bit (two words) positions of the input register 1 and the rotator 5 one fully employed, while in the shrinking operation only 8 bits of the rotator and the input register are used.

At first, a first word (8 bits) and a second word (8 bits) (for example, A B C D E F G H A'B'C' D'E'F'G'H') are entered into the input register 1 of the 16 bits. The rotator 5 of the 16 bits shifts the 16 bits of the first and second words by number of bits designated in FIG. 4 in accordance with the scale factor. A start bit to be enlarged is located at the most significant bit (MSB) position. For the first enlarged word, no rotation is made as shown in FIG. 4. An output of the rotator 5 is sent to the enlarging circuit 3.

Figure 6:
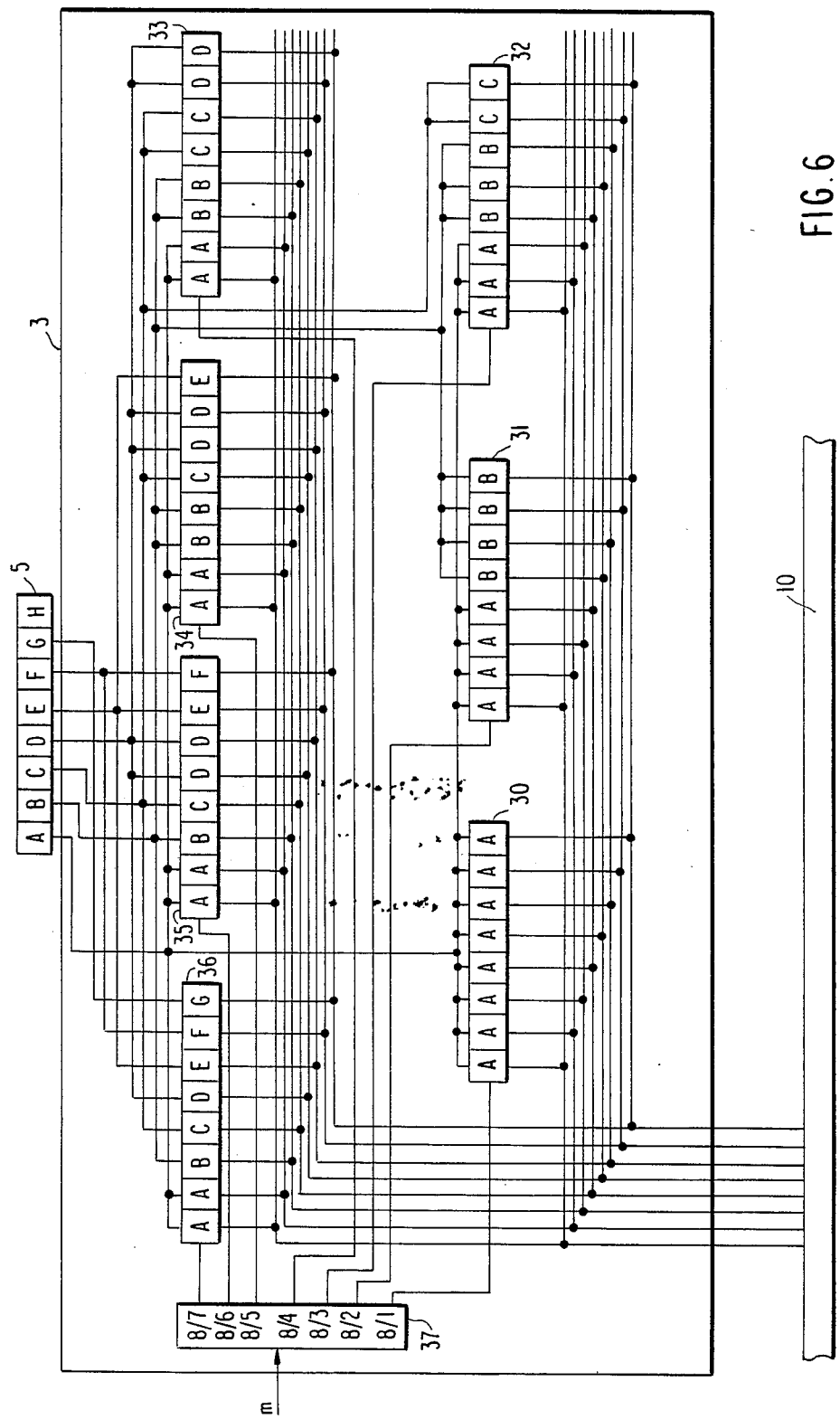
FIG. 6 shows a block diagram of the enlargement circuit of the embodiment.

Referring to FIG. 6, the enlarging circuit 3 contains seven 8-bit gate circuits 30 to 36 which are coupled to the respective bit positions of the 8-bit input data lines of the circuit 3 such that the eight outputs from the first 8-bits of the input data shown in FIG. 3(b) may be respectively derived therefrom. A decoder 37 is also provided to receive a scale factor for which the denominator in the enlarging scale factor Se (=n/m=8/m) may be used and to select one of the seven gate circuits according to the inputted scale factor m. The selected one of the seven gate circuits 30 to 36 is enabled by the output of the decoder 37. If the source image is to be enlarged by 8/3 times, for example, the gate circuit 32 is enabled. Therefore, AAABBBCC is derived from the enlarging circuit 3 as a first enlarged output for the original pixel data and directly sent to the output register 6 through which this output is sent to the destination memory (not shown). Then, the same 16-bit input data is shifted in the rotator 5 by m bits (in the above case, 3 bits) such that the (m+1)th (4th) bit locates at a first bit position. Thus, if m is 3, the data D E F G H A'B'C'- D'E'F' G'H' (where D E F G H are remaining bits of the pixel data of the first word and A'B'C'D'E'F' G'H' is the pixel data of the second word) is obtained by the rotator 5 and inputted to the enlarging circuit 3, and from the first eight bits D E F G H A'B'C' an output data DDDEEEFF is derived through the selected gate circuit 32 for m=3. This data is directly sent to the output register 6 as a second enlarged data for the first input word A B C D E F G H. Further, the rotator 5 peforms shift operation by 2m bits (6 bits in the above case) and first eight bits G H A'B'C'D'E'F' of the 6-bit shifted input words are subjected to the enlarging operation by the enlarging circuit 3 to obtain a third output data GGGHHHA'A' through the gate circuit 32. After the enlargement of the first word is thus completed, a third word A"B"C"D"E"F"G"H" of 8 bits in the source image is newly entered into the input register 1 instead of the first word. Thereafter the rotator 5 rotates 3m (9) bits and B' C'D'E'F'G'H'A" (B'C'D'E'F'G'H' are the remaining portion of the second word and A" belongs to the third word) obtained by the rotator 5 are inputted to the enlarging circuit 3. As a result an output data B'B'B'C'C'C'D'D' is derived through the gate circuit 32. Thus, whenever enlargement of one word is completed, a new word is entered into the input register. When the other enlargement scale factor (m=1, 2, 4, 5, 6, 7 or 8) is selected. kxm-bit (k=o, 1, 2, 3, ...) rotating operation is performed by the rotator and one of the seven gate circuits 30 to 36 is enabled according to the enlargement scale factor m.

What is claimed is:

1. An image processing apparatus performing a shrinking operation comprising:
    an input means for receiving a plurality of bits which represent an image to be shrunk;
    a plurality of gate circuits each gating simultaneously one or more bits among said bits received by said input means, the number of bits to be gated by said respective gate circuits being different from one another and corresponding to respective shrinking scale factors;
    means for selecting one of said gate circuits according to the designated shrinking scale factor to activate the selected gate circuit;
    a temporary register;
    a rotator coupled to said selected gate circuit and said temporary register for shifting one or more bits gated by said selected gate circuit in accordance with said designated shrinking scale factor to write the shifted one or more bits into the corresponding bit position or positions of said temporary register; and
    an output means coupled to said temporary register for outputting the content of said temporary register as shrunk one word data.

2. An image processing apparatus as claimed in claim 1, further comprising means for masking the bit position or positions of said temporary register which have been already written with one or more bits gated by said selected gate circuit.

3. An image processing apparatus performing an enlarging operation comprising;
    an input means for receiving a plurality of input bits representing an image to be enlarged;
    a shift means coupled to said input means for shifting said input bits by a bit number determined by an enlargement scale factor;
    a plurality of gate circuits gating a plurality of bits which are the same in number as said input bits and contain two or more bits having the same content as that of at least the first bit of the shifted input bits;
    a means for selecting one of said gate circuits according to said enlargement scale factor to activate the selected gate circuit; and
    an output means coupled to said gate circuits for outputting the bits which pass through the selected gate.

4. An image processing apparatus comprising a first register temporarily storing input data representing an image and comprising N bits, N being an integer;
    a plurality of gate circuits, the number of which is smaller than N by one, first one to (N-1)th one of said gate circuits respectively gating one bit to (N-1) bits among said N bits of said input data;
    decoder decoding shrinkage data representative of a shrinkage scale factor and selecting one of said gate circuits to open the selected gate circuit; and
    means for producing shrunk data comprising said N bits in response to a bit or bits transferred from said selected gate circuit,
    said producing means including a temporary register from which said shrunk data is derived, a rotator shifting the bit or bits transferred from said selected gate circuit by a value determined by said shrinking scale factor, means for writing the shifted bit or bits into vacant bit position or positions of said temporary register, and means for reading out the content of said temporary register as said shrunk data when all the bits of said temporary register are filled.

5. An image processing apparatus comprising a first register temporarily storing input data representing an image and consisting of a plurality of bits, a rotator shifting said input data by a value determined by an enlargement scale factor to produce shifted data, a plurality of gate circuits respectively receiving one or more bits of said shifted data and respectively producing first data consisting of a plurality of bits, the numbers of bits received by the respective gate circuits being different from one another and the numbers of bits of said first data produced by the respective gate circuits being equal to one another, each of said first data produced by said gate circuits containing two or more bits having the same content as at least a first bit of said shifted data, means responsive to said enlargement scale factor for selecting one of said gate circuits to activate the selected gate circuit, a second register from which enlarged output data is derived, and means for storing the first data produced by said selected gate circuit into said second register.

6. The apparatus as claimed in claim 5, wherein said first register stores said input data in two-word length and each of said gate circuits produces said first data in one-word length.

* * * * *

UNITED STATES PATENT AND TRADEMARK OFFICE
CERTIFICATE OF CORRECTION

PATENT NO. : 4,907,284
DATED : March 6, 1990
INVENTOR(S) : Mitsurou OHUCHI

It is certified that error appears in the above-identified patent and that said Letters Patent is hereby corrected as shown below:

Col. 1, line 40, delete "getting" and insert --gating--;

Col. 2, line 30, delete "opeation" and insert --operation--;

Col. 2, lines 58 and 59, delete "ED" and insert --DE--;

Col. 3, line 15, delete "pixcel" and insert --pixel--;

Col. 3, lines 33, after "only" insert --be--.

Signed and Sealed this

Sixth Day of October, 1992

Attest:

DOUGLAS B. COMER

Attesting Officer

Acting Commissioner of Patents and Trademarks